Oct. 21, 1941.  W. R. TALIAFERRO  2,259,965
AUTOMATIC RECLOSING CIRCUIT BREAKER SYSTEM
Filed Aug. 11, 1939
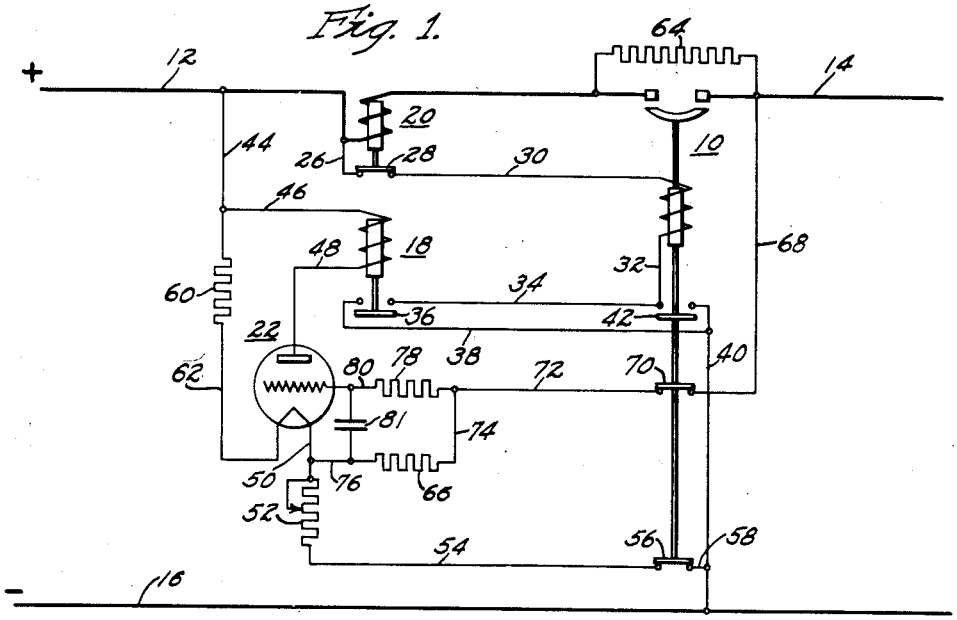
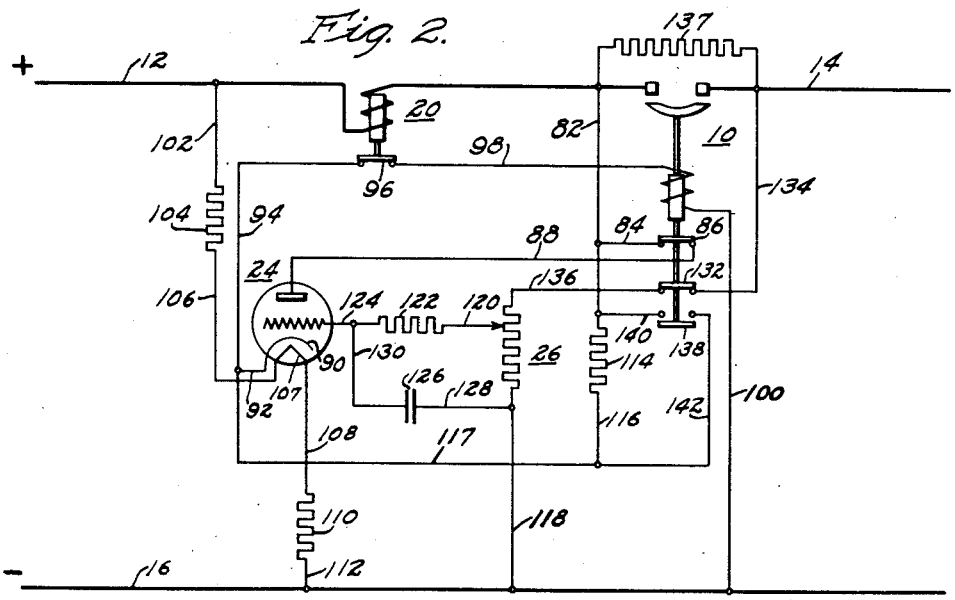
WITNESSES:
Leon M. Garman
Joe Weber
INVENTOR
William R. Taliaferro.
BY
G. M. Crawford
ATTORNEY Patented Oct. 21, 1941

2,259,965

UNITED STATES PATENT OFFICE 2,259,965

AUTOMATIC RECLOSING CIRCUIT BREAKER SYSTEM

William R. Taliaferro, Pittsburgh, Pa., assignor to Westinghouse Electric & Manufacturing Company, East Pittsburgh, Pa., a corporation of Pennsylvania Application August 11, 1939, Serial No. 289,602

4 Claims. (Cl. 175—294)

My invention relates, generally, to control systems and, more particularly, to load measuring control systems for automatic reclosing circuit breaker systems.

It is common practice to provide load measuring systems for controlling circuit breakers which function to measure the load on the load circuit and to actuate the circuit breaker to energize the load circuit only when the load is below a predetermined maximum. Heretofore such systems have required very sensitive and expensive relays for their satisfactory operation.

An object of my invention is to provide an automatic load measuring control system for a circuit breaker which shall function efficiently and economically without the use of sensitive and expensive relays.

A further object of the invention is to provide an automatic load measuring circuit breaker control system which shall be sensitive, simple, and reliable in operation, and inexpensive to manufacture, install, maintain and operate.

Another object of the invention is to provide an automatic reclosing circuit breaker control system controlled by an electric discharge device and having time delayed reclosing means controlled in accordance with the characteristics of the electric discharge device and its operating circuits.

These and other objects and advantages of the invention will be apparent from the following detailed description taken in connection with the accompanying drawing in which:

Figure 1 is a diagrammatic view of an automatic reclosing circuit breaker control system embodying the principal features of my invention; and Fig. 2 is a diagrammatic view of another automatic reclosing circuit breaker control system embodying the principal features of my invention. Like reference characters indicate corresponding parts in the two figures of the drawing.

In practicing the embodiment of the invention shown in Fig. 1 of the drawing, I provide a circuit breaker 10 disposed to connect a positive power bus conductor 12 with a load circuit conductor 14, the negative conductor 16 being directly connected to the load circuit. The circuit breaker 10 is controlled by an auxiliary relay 18 and an overload relay 20. An electric discharge device 22 is connected in a Wheatstone bridge circuit which includes the effective resistance of the load on the conductors 14 and 16, to energize the auxiliary relay 18, which, in turn, closes the circuit breaker 10 when the effective load resistance is above a predetermined amount.

The embodiment of the invention shown in Fig. 2 is similar to that of Fig. 1 except that an electric discharge device 24 is connected to close the circuit breaker 10 when it is rendered conductive by the potential drop across a biasing resistor 26 which is connected across the load circuit conductors 14 and 16 while the circuit breaker is open. When a predetermined equivalent load resistance exists between the load circuit conductors 14 and 16, there will be sufficient potential drop across the biasing resistor 26 to render the electric discharge device 24 conductive to thereby close the circuit breaker 10.

Considering the embodiment of the invention shown in Fig. 1 more in detail, the closing winding of the circuit breaker 10 is connected to be energized in a circuit extending from the conductor 12 through the conductor 26, the contact element 28 of the overload relay 20, conductor 30, the closing winding of the circuit breaker 10, conductors 32 and 34, contact element 36 of the auxiliary relay 18 and conductors 38 and 40 to the power circuit conductor 16. When the circuit breaker 10 has been actuated to closed position, its contact element 42 closes a holding circuit for the circuit breaker which extends from the power circuit conductor 12 through the conductor 26, contact element 28, conductor 30, the closing winding of the circuit breaker 10, conductor 32, contact element 42 and conductor 40 to the power circuit conductor 16.

The auxiliary relay 18 is connected to be controlled by the electric discharge device 22 in a circuit which extends from the conductor 12 through the conductors 44 and 46, the winding of relay 18, conductor 48, the discharge device 22, conductor 50, adjustable resistor 52, conductor 54, contact element 56 and conductors 58 and 40 to the conductor 16.

The cathode of the electric discharge device is connected to be energized in a circuit controlled by the back contact element 56 of the circuit breaker 10 which extends from the conductor 12 through the conductor 44, a resistor 60, conductor 62, the cathode of the electric discharge device 22, conductor 50, adjustable resistor 52, conductor 54, contact element 56 and conductors 58 and 40 to the conductor 16.

The resistors 60 and 52, a resistor 64 connected between the power circuit conductor 12 and the load circuit conductor 14 constitute three legs and the effective load resistance between the conductors 14 and 16 constitutes a fourth leg of a Wheatstone bridge circuit, and a biasing resistor 66 is connected in the galvanometer position in the bridge circuit in a circuit which extends from the conductor 14, conductor 68, back contact element 70 of the circuit breaker 10, conductors 72 and 74, biasing resistor 66 and conductor 76 to the conductor 50. The grid of the electric discharge device 22 is connected to one terminal of the resistor 66 through the conductors 74 and 72, a current limiting resistor 78 and a conductor 80. The grid of the electric discharge device 22 therefore has applied to it the potential existing on the right hand terminal of the resistor 66.

In the operation of the device, with the conductors 12 and 16 connected to the source of direct current power, and the conductors 14 and 16 connected to a load, assuming that an overload condition such as a short circuit has caused the overload relay 20 to open its back contact element 28 to thereby cause the circuit breaker 10 to open, with this circuit breaker in the open position the back contact element 56 of the circuit breaker will close the energizing circuit for the cathode of the electric discharge device 22 and the cathode will begin heating. With the short circuit overload on the conductors 14 and 16, current will flow through the resistor 66 from left to right in a circuit extending from the conductor 12 through the conductor 44, the resistor 60, the conductor 62, the cathode of the device 22, conductors 50 and 76, the resistor 66, conductors 74 and 72, contact element 70, the conductor 68, and the load circuit to the conductor 16, thus placing a negative potential upon the grid of the electric discharge device 22 preventing the discharge device from conducting current. If now the fault on the conductors 14 and 16 is cleared, the equivalent load resistance between conductors 14 and 16 will be raised and current will flow in the opposite direction, that is, from right to left, through the biasing resistor 66 in a circuit extending from the conductor 12 through the resistor 64, the conductor 68, the contact element 70, the conductors 72 and 74, the resistor 66, the conductors 76 and 50, the resistor 52, the conductor 54, the contact element 56, and the conductors 58 and 40 to the conductor 16, thus placing a positive potential upon the grid of the electric discharge device 22. If at this time the cathode of the electric discharge device 22 has been heated to such a temperature as to produce normal emission from the cathode, the electric discharge device 22 will be rendered conductive and the auxiliary relay 18 will be energized to close its contact element 36 to thus actuate the circuit breaker 10 to closed position.

Upon closing, the circuit breaker 10 will close its own holding circuit and will open the back contact elements 56 and 70 to open the anode-cathode circuit and the cathode heating circuit and the grid biasing resistor circuit of the electric discharge device 22.

It will be noted that a time delay in reclosing the breaker 10 is provided by the time interval required for the cathode of the electric discharge device 22 to be heated to full emission temperature after the circuit breaker has opened. When the anode-cathode circuit of the electric discharge device 22 is opened by the back contact element 56 of the circuit breaker 10, the auxiliary relay 18 will be deenergized and its contact element 36 will return to the open circuit position.

A conventional by-pass condenser 81 is connected between the cathode and the grid of the electric discharge device 22, and functions to prevent the tube from passing anode current before the cathode attains the necessary temperature for normal emission. The condenser 81 also prevents discharge of the discharge device 22 by transient phenomena such as static and protects the discharge device from damage due to anode potential being applied before the full cathode emission is attained.

In the embodiment of the invention shown in Fig. 2 the electric discharge device 24 is connected to directly energize the closing coil of the circuit breaker 10 in a circuit which extends from the conductor 12 through the conductors 82 and 84, back contact element 86 of the circuit breaker 10, conductor 88, the anode of the electric discharge device 24, the cathode 90, conductors 92 and 94, contact element 96 of the overload relay 20, conductor 98, the closing coil winding of the circuit breaker 10 and conductor 100 to the conductor 16.

A normally energized heating circuit for the cathode of the electric discharge device 24 is provided and extends from the conductor 12 through the conductor 102, a resistor 104, conductor 106, a heating element 107, conductor 108, a resistor 110, a conductor 112 to the conductor 16.

A normally energized circuit is provided for the winding of the closing coil of the circuit breaker 10 which extends from the conductor 12 through the conductor 82, a resistor 114, a conductor 116, conductors 117 and 94, contact element 96, conductor 98, the winding of the closing coil of the circuit breaker 10 and conductor 100 to the conductor 16. The resistance of the resistor 114 is such as to permit a current flow through the winding of the closing coil of the circuit breaker 10 which is of a lower value than will cause the circuit breaker to close. However, it provides a potential drop across the winding of the closing coil of the circuit breaker 10 which provides a negative bias for the grid of the electric discharge device 24, preventing the discharge device from passing current. This negative bias of the grid obtains while the overload or short circuit exists on the load circuit by virtue of the fact that there is very little potential drop in the resistor 26 to which the grid is connected because it is shunted by the low impedance load circuit. The grid is therefore, at practically the same potential as the conductor 16 while the cathode 90 is at a potential equal to the potential drop across the winding of the closing coil of the circuit breaker 10. Thus the potential of the grid of the electric discharge device 24 will remain negative with respect to the cathode potential until the resistance of the load circuit increases sufficiently to permit sufficient current flow through the resistor 26 to produce a potential drop across the resistor from the point of the resistor to which the grid is electrically connected and the conductor 16 at least equal to the drop across the winding of the closing coil of the circuit breaker 10.

A shunting circuit for the selected part of the resistor 26 and the resistor 122 including a condenser 126 is provided and extends from the conductor 118 through the conductor 128, the condenser 126 and conductor 130 to conductor 124. The condenser 126 is thus held charged with the polarity of the negative potential applied to the grid.

With the circuit breaker 10 in the open position, a back contact element 132 of the circuit breaker controls a circuit which connects the resistor 26 across the load circuit conductors 14 and 16 and which extends from the conductor 14 through the conductor 134, back contact element 132, conductor 136, the resistor 26 and conductor 118 to the conductor 16. Potential is supplied to the load circuit conductor 14 from the power circuit conductor 12 when the circuit breaker is open through a resistor 137.

A front contact element 138 on the circuit breaker 10 is connected in a circuit extending from the conductor 82 through the conductor 140, contact element 138 and conductor 142 to the conductor 116 to close a shunting circuit for the current limiting resistor 114, so that sufficient potential may be applied to the winding of the closing coil of the circuit breaker 10 to hold it in closed circuit position.

In the operation of the embodiment of the invention of Fig. 2, assuming that the circuit breaker 10 has just opened and is in the position shown in the drawing, and assuming that the overload or short circuit which caused the tripping of the breaker by the actuation of the overload relay 20 still exists between the conductors 14 and 16, the negative bias circuit will be established for the grid of the electric discharge device 24 by the opening of the contact element 138, the condenser 126 will be charged with a negative potential relative to the cathode, and no current will flow through the electric discharge device 24. With the short circuit or overload still connected to the conductors 14 and 16, little or no current will flow through the resistor 26 since it is shunted by the overload or short circuit and there will be no appreciable potential drop across the resistor 26. However, when the short circuit or overload is removed, current will flow through the resistor 26 from the conductor 12 through the resistor 137, the conductor 134, contact element 132, conductor 136, resistor 26 and conductor 118 to the conductor 16. This will cause the potential drop across the biasing resistor 26 in such a direction as to tend to place a positive potential upon the grid of the electrical discharge device 24. However, the charge existing upon the condenser 126 will have to be discharged through the resistors 122 and 26 before the condenser can be charged in the opposite direction by the potential drop across the resistor 26 caused by the current flow between the power conductors. This discharge of the condenser 126 will tend to cause a current flow opposite to the direction of the current flow in the resistor 26 while the condenser is discharging, thus preventing the positive biasing potential from being applied to the grid until the condenser 126 has discharged. Thus, there is a time delay between the time that the fault is removed from the conductors 14 and 16 and the instant that the grid of the electric discharge device 124 is charged with a positive potential, thus delaying the closure of the circuit breaker 10 an interval after the fault is removed from the load conductors 14 and 16. This time delay will be proportional to the resistance in the discharge circuit of the condenser 126 and the capacity of the condenser 126, and will also be determined by the load on the conductors 14 and 16, since the current flow through the resistor 26 will be inversely proportional to the load on the conductors 14 and 16. Thus, the greater the load on the power conductors 14 and 16, the longer will be the delay of the closure of the circuit breaker 10. With the grid of the electric discharge device 24 charged positively, the discharge device will conduct current to energize the winding of the closing coil of the circuit breaker 10 to close the circuit breaker.

Any well known means may be provided for maintaining the back contact element 86 of the circuit breaker 10 in closed circuit position until the front contact element 138 of the circuit breaker 10 has closed to complete the holding circuit for the winding of the closing coil of the circuit breaker 10. With the circuit breaker closed, contact elements 86 and 132 will open to deenergize the anode and the grid resistor biasing circuit of the electric discharge device 24.

It is to be understood that the electric discharge device 24 of the embodiment of the invention of Fig. 2 may be a cold cathode grid glow tube in which event the heating element 107 and its associated circuit would not be necessary. While the electric discharge devices 22 and 24 described herein are of the arc like type, it is to be understood that high vacuum electric discharge devices may be used in a similar manner in the circuits disclosed. In the event of the use of high vacuum electric discharge devices, it will be necessary to calibrate the auxiliary relay 18 and the winding of the closing coil of the circuit breaker 10 so as to cause the auxiliary relay 18 and the circuit breaker 10 to close upon a predetermined amount of current in their respective circuits.

It will be seen that I have provided an automatic load measuring control system for a circuit breaker which shall function efficiently and economically without the use of sensitive and expensive relays and which shall be sensitive, simple and reliable in operation and inexpensive to manufacture, install, maintain and operate.

In compliance with the requirements of the patent statutes, I have shown and described herein the preferred embodiments of my invention. It is to be understood, however, that the invention is not limited to the precise constructions shown and described, but is capable of modification by one skilled in the art, the embodiments herein shown and described being merely illustrative of the principles of my invention.

I claim as my invention:

1. In a control system for a circuit breaker disposed to connect a load circuit to a source of power, the combination comprising an electric discharge device of the arc-like type, a Wheatstone bridge circuit comprising the load circuit as one leg thereof and a resistor connected in the galvanometer position thereof, circuit means connecting the cathode of the said discharge device to be energized in one leg of the Wheatstone bridge circuit with one of its terminals electrically connected to one terminal of said resistor, a second circuit connected in the galvanometer position of the bridge circuit comprising a second resistor and the grid of said discharge device, a capacitor connected between the grid of said discharge device and the said one terminal of said first resistor, circuit means connecting the anode of said discharge device to be energized by the source of power, the resistance values of the legs of the bridge being such that the current flow in said first resistor will be in such a direction as to provide a negative bias for the grid of said discharge device when the effective resistance of the load circuit is below a predetermined amount and in such a direction as to provide a positive bias for the grid when the effective resistance of the load circuit is above a predetermined amount, means responsive to the opening of the circuit breaker for connecting said Wheatstone bridge circuit to be energized by the source of power, and means responsive to the conductive condition of said discharge device for closing the circuit breaker.

2. In a control system for a circuit breaker which is disposed to connect a load circuit to a source of power, the combination comprising an electric discharge device of the arc-like type, a Wheatstone bridge circuit comprising the load circuit as one leg thereof and a resistor connected in the galvanometer position thereof, circuit means connecting the cathode of the said discharge device to be energized in one leg of the Wheatstone bridge circuit with one of its terminals electrically connected to one terminal of said resistor, circuit means electrically connecting the grid of said discharge device to the other terminal of said resistor, circuit means connecting the anode of said discharge device to be energized by the source of power, the resistance values of the legs of the bridge being such that the current flow in the said resistor will be in such a direction as to provide a negative bias for the grid of said discharge device when the effective resistance of the load circuit is below a predetermined amount and in such a direction as to provide a positive bias for the grid when the effective resistance of the load circuit is above a predetermined amount, means responsive to the opening of the circuit breaker for connecting said Wheatstone bridge circuit to be energized by the source of power, and means responsive to the conductive condition of said discharge device for closing the circuit breaker.

3. In a control system for a circuit breaker which is disposed to connect a load circuit to a source of power, the combination comprising an electric discharge device of the arc-like type, a Wheatstone bridge circuit comprising the load circuit as one leg thereof, a first resistor, means connecting said first resistor in parallel circuit relation with the load circuit, a second resistor, means electrically connecting one terminal of said second resistor to an intermediate point on said first resistor means electrically connecting the second terminal of said second resistor to the grid of said discharge device, a capacitor means electrically connecting said capacitor between said grid and a terminal of said first resistor, means electrically connecting the cathode of said discharge device with said bridge circuit so as to provide a circuit in the galvanometer position comprising a portion of said first resistor, said second resistor and the grid and cathode of said discharge device, means controlled by the opening of the circuit breaker for connecting said bridge circuit and the anode of said discharge device to be energized by the source of power, and means responsive to the conductive condition of said discharge device for closing said circuit breaker.

4. In a control system for a circuit breaker which is disposed to connect a load circuit to a source of power, the combination comprising an electric discharge device of the arc-like type, a Wheatstone bridge circuit including the load circuit as one leg thereof and having the grid and cathode of the said discharge device connected in the galvanometer position thereof, a shunting circuit for the load circuit comprising a resistor so connected with respect to the grid and cathode of said discharge device as to determine the relative potentials of said grid and cathode, and to thereby render said discharge device conductive when a predetermined equivalent resistance exists on the said load circuit, means applying an operating potential to the Wheatstone bridge circuit and a positive potential to the anode of said electric discharge device, and means responsive to the conductive condition of said discharge device for closing the circuit breaker.

WILLIAM R. TALIAFERRO.